(12) United States Patent
Masuya et al.

(10) Patent No.: US 11,370,304 B2
(45) Date of Patent: Jun. 28, 2022

(54) HEAD-UP DISPLAY DEVICE

(71) Applicant: NIPPON SEIKI CO., LTD., Niigata (JP)

(72) Inventors: Yuki Masuya, Niigata (JP); Makoto Hada, Niigata (JP); Shunsuke Saji, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 17/253,405

(22) PCT Filed: Jul. 5, 2019

(86) PCT No.: PCT/JP2019/026799
§ 371 (c)(1),
(2) Date: Dec. 17, 2020

(87) PCT Pub. No.: WO2020/009219
PCT Pub. Date: Jan. 9, 2020

(65) Prior Publication Data
US 2021/0260999 A1   Aug. 26, 2021

(30) Foreign Application Priority Data

Jul. 5, 2018 (JP) ............................. JP2018-127944
Jul. 3, 2019 (JP) ............................. JP2019-124266

(51) Int. Cl.
*B60K 35/00* (2006.01)
*G02B 27/01* (2006.01)

(52) U.S. Cl.
CPC .......... *B60K 35/00* (2013.01); *G02B 27/0101* (2013.01); *B60K 2370/1529* (2019.05); *B60K 2370/31* (2019.05); *G02B 2027/014* (2013.01)

(58) Field of Classification Search
CPC ............ B60K 35/00; B60K 2370/1529; B60K 2370/31; B60K 2370/177;
(Continued)

(56) References Cited

U.S. PATENT DOCUMENTS

| 2013/0179023 A1 | 7/2013 | Schmidt |
| 2018/0024354 A1 | 1/2018 | Shibata et al. |
| 2019/0025580 A1* | 1/2019 | Nagano .................. B60K 35/00 |

FOREIGN PATENT DOCUMENTS

| JP | 2543711 Y2 | 8/1997 |
| JP | 2016-064759 A | 4/2016 |

(Continued)

OTHER PUBLICATIONS

International Search Report issued in corresponding International Patent Application No. PCT/JP2019/026799, dated Sep. 3, 2019, with Engish translation.

*Primary Examiner* — Brent D Castiaux
(74) *Attorney, Agent, or Firm* — McDermott Will & Emery LLP

(57) ABSTRACT

Provided is a head-up display device which can stably display a virtual image viewed so as to be stuck to a road surface, during traveling of a vehicle. A head-up display device according to the present invention is provided with a display means for projecting display light to a front window shield provided to a vehicle, and generating and displaying a virtual image, formed by the display light reflected at the front window shield, so as to be superposed on an actual scene seen through the front window shield. At least a part of a virtual image display region in which the virtual image is displayed is positioned below a road surface on which the vehicle travels.

14 Claims, 8 Drawing Sheets

(58) Field of Classification Search
CPC ........ B60K 2370/178; B60K 2370/179; G02B 27/0101; G02B 27/0179; G02B 2027/014; G02B 2027/0183; G02B 26/0816
See application file for complete search history.

(56) References Cited

FOREIGN PATENT DOCUMENTS

| | | | |
|---|---|---|---|
| JP | 201664759 A | * | 4/2016 |
| JP | 2016-212338 A | | 12/2016 |
| JP | 2017-206191 A | | 11/2017 |
| JP | 2018-077400 A | | 5/2018 |
| WO | 2016/129219 A1 | | 8/2016 |
| WO | 2017/134865 A1 | | 8/2017 |
| WO | WO2017134865 | * | 8/2017 |

* cited by examiner

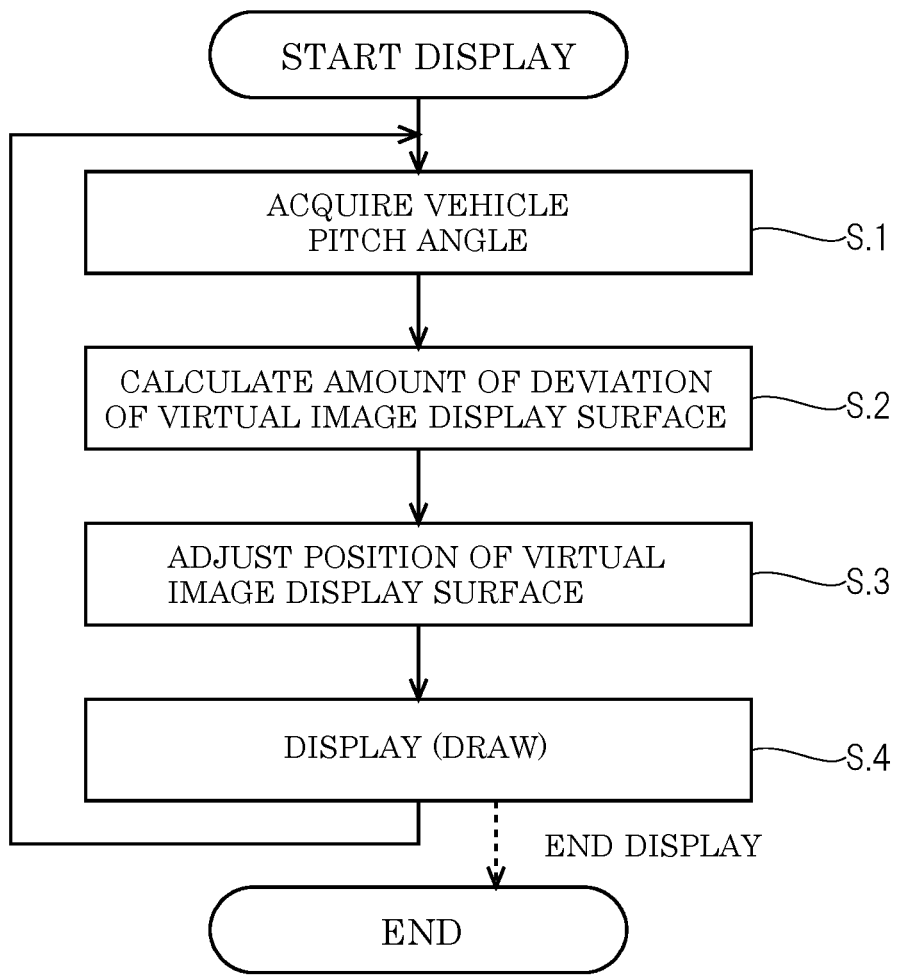

HEAD-UP DISPLAY DEVICE

CROSS REFERENCE

This application is the U.S. National Phase under 35 U.S.C. § 371 of International Application No. PCT/JP2019/026799, filed on Jul. 5, 2019, which claims the benefit of Japanese Application No. 2018-127944, filed on Jul. 5, 2018 and Japanese Application No. 2019-124266, filed Jul. 3, 2019, the entire contents of each are hereby incorporated by reference.

TECHNICAL FIELD

The present invention relates to a head-up display device that displays a virtual image on a front window shield, a combiner, or the like of a vehicle.

BACKGROUND ART

A head-up display device that creates a virtual image by the display light reflected by a reflective transmissive member such as the front window shield or combiner of a vehicle and displays the virtual image by superimposing it on a real scene (scenery in front of the vehicle) that is transmitted through the reflective transmissive member contributes to safe and comfortable vehicle operation by providing the information desired by a viewer as the virtual image while suppressing the movement of the line of sight of the viewer who drives the vehicle as much as possible.

For example, the head-up display device described in Patent Document 1 is installed on the dashboard of a vehicle and projects display light onto a front wind shield, and the display light reflected by the front window shield allows a viewer to visually recognize a virtual image on a virtual image display region. In the patent document, a first virtual image on a first virtual image display region substantially parallel to a road surface on which the vehicle travels, and a second virtual image on a second virtual image display region that is substantially parallel to a direction perpendicular to the traveling direction of the vehicle are displayed so as to form a predetermined angle.

PRIOR ART DOCUMENT

Patent Document

Patent Document 1: Japanese Unexamined Patent Application Publication No. 2016-212338

SUMMARY OF THE INVENTION

Problems to be Solved by the Invention

In Patent Document 1, the first virtual image is visually recognized by being superimposed over a predetermined range of the road surface. However, the first virtual image display region is located above the road surface (see paragraph [0015] and FIG. 1 of the same patent document), and thus the first virtual image appears to the viewer as if it were floating from the road surface. There are cases where it is desirable that a virtual image such as an arrow indicating the route of a vehicle is not visually recognized as floating from the road surface as in the first virtual image in the same document, but is visually recognized by sticking to the road surface.

However, for this reason, as illustrated in FIG. 15(a), if a virtual image display region 80 is positioned at the same height as a road surface 81 instead of above the road surface 81, when the road surface 81 is not flat or the posture of a vehicle 82 changes (the pitching angle changes) while the vehicle 82 is running, there has been a problem, as illustrated in FIG. 15(b), that the virtual image display region 80 floats above the road surface 81 and a virtual image 83 floats up from the road surface 81, and thus a viewer 84 can easily feel the discomfort that the virtual image 83 does not match with the road surface 81.

The present invention has been made in view of the above circumstances, and an object of the present invention is to provide a head-up display device capable of stably displaying a virtual image that is visually recognized to stick to a road surface when a vehicle is traveling.

Solution to Problem

In order to solve the above problems, a head-up display device according to the present invention includes a display unit including a display surface that emits display light that is a source of a virtual image, and a relay optical system configured in such a manner that the display light emitted by the display surface is relayed toward a projected unit, and that at least a part of a virtual image display region is positioned below a road surface on which a vehicle travels.

Here, the "road surface on which a vehicle travels" includes a road surface at a height where the vehicle is expected to travel, or is a road surface in the traveling direction of the vehicle, that a viewer can see as a real scene (if the vehicle travels forward, the road surface in front of the vehicle). For example, even when the "road surface on which a vehicle travels" is detected by a road surface detecting means, the road surface at a same height as that of the road surface on which the vehicle touches the ground may be regarded as the "road surface on which a vehicle travels".

Effect of the Invention

According to the head-up display device according to the present invention, a virtual image that is visually recognized to stick to a road surface can be stably displayed when a vehicle is traveling.

BRIEF DESCRIPTION OF THE DRAWINGS

FIG. 5 is a flowchart illustrating an adjustment process of a virtual image display region generated by the head-up display device of FIG. 1.

MODE FOR CARRYING OUT THE INVENTION

A mode for carrying out the present invention will be described with reference to the drawings. In the description of the present embodiment, the right-left direction when a driver (viewer) seated in the driver's seat of a vehicle faces the front of the vehicle is the X axis (left direction is the X axis positive direction), the up-down direction is the Y axis (upward direction is the Y axis positive direction), and the front-rear direction is the Z axis (front direction is the Z axis positive direction).

Figure 1:
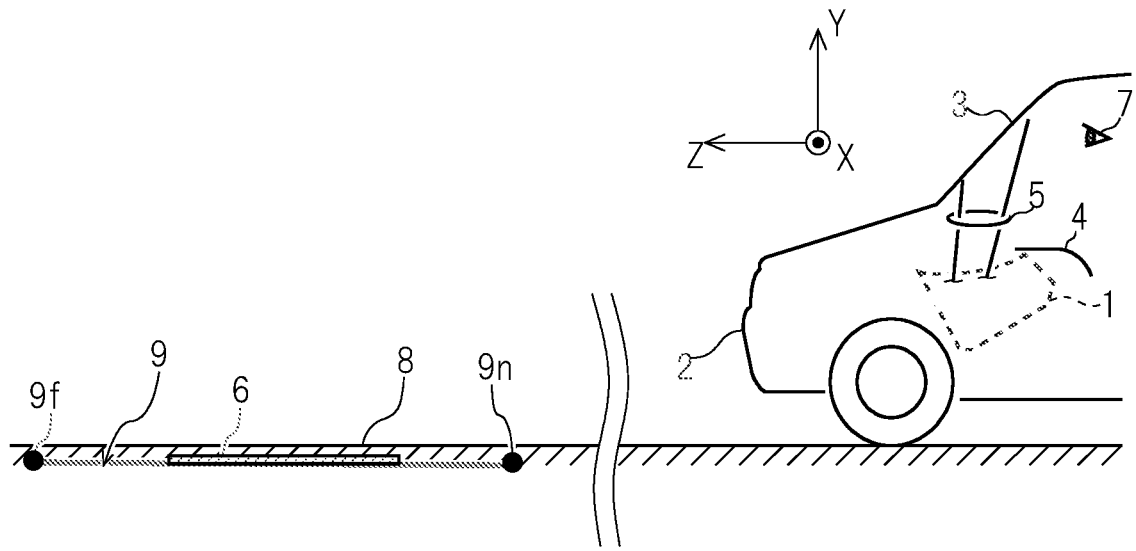
FIG. 1 is an explanatory diagram illustrating a vehicle provided with a head-up display device according to a mode for carrying out the invention.

As illustrated in FIG. 1, a head-up display device (HUD) 1 according to the present embodiment is provided inside a dashboard 4 located below a front window shield 3 of a vehicle 2, and projects display light 5 onto a part of the front window shield 3. The HUD 1 emits the display light 5 toward the front window shield 3 (an example of the projected unit) which is a reflection/transmission member that reflects and transmits light, and generates an eyebox (not illustrated) in a predetermined region by the display light 5 reflected by the front window shield 3. By arranging an eyepoint in the eyebox, a viewer 7 can visually recognize an entire image displayed by the HUD 1. Here, the eyebox is defined as a region where the entire image can be seen, but is not limited to this, and is a region where the image displayed by the HUD 1 can be visually recognized in a desired state, such as a region where the distortion of the image displayed by the HUD 1 viewed by the viewer falls within a predetermined threshold value. An image (virtual image 6) is visually recognized in a virtual image display region 9 on the front side (Z axis positive direction) of the front window shield 3 (an example of the projected unit). As a result, the viewer 7 can visually recognize the image (virtual image 6) that overlaps the foreground which is a real space visually recognized via the front window shield 3.

The HUD 1 includes a display unit 12 including a display surface for displaying an image, and a relay optical system 13.

Figure 2:
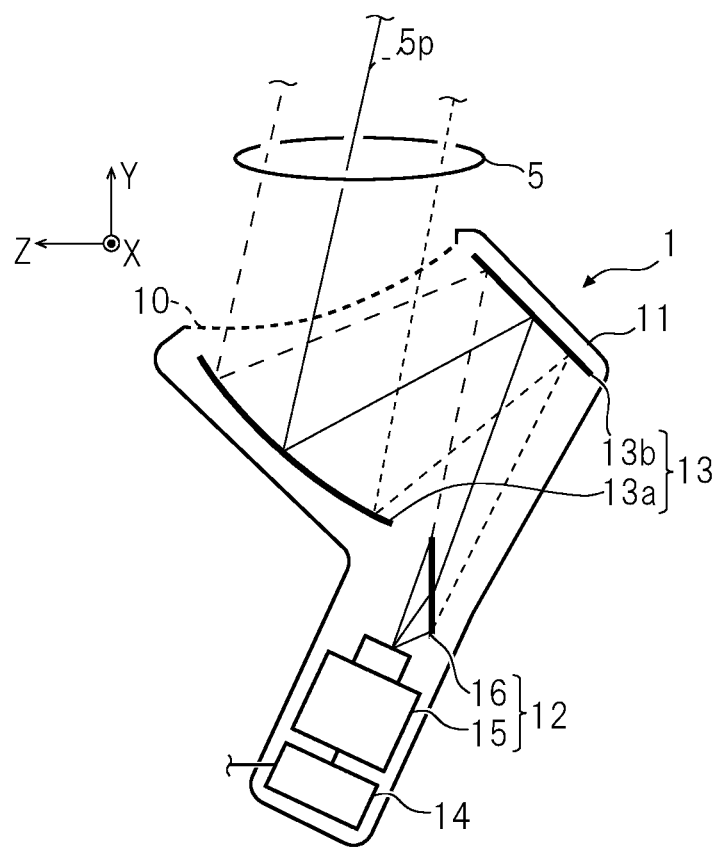
FIG. 2 is an explanatory diagram illustrating the configuration of the head-up display device of FIG. 1.
Figure 3:
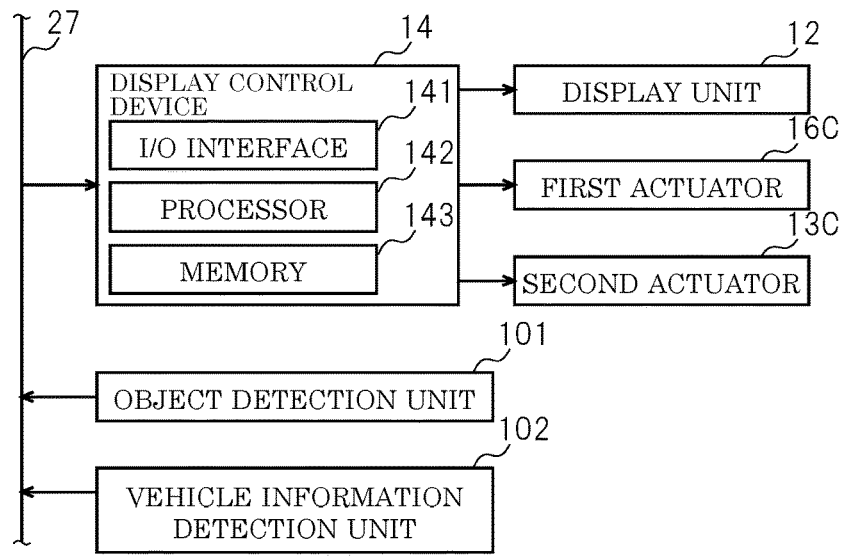
FIG. 3 is a block diagram illustrating the configuration of the head-up display device of FIG. 1 and the relation with external devices connected to this.

The display unit 12 in FIG. 2 is a projection type display including a projector 15 and a screen 16 (an example of a display surface) that receives the projected light from the projector 15 and displays an image (real image). The display unit 12 may be a transmission type display that transmits light from a back light such as an LCD, or may be a self-luminous display. In these cases, the display surfaces are a display surface of the transmission type display (an example of a display surface) and are the screen 16 (an example of a display surface) of the projection type display. The display surface is positioned at an angle perpendicular to an optical axis $5p$ of the display light 5 directed from the display surface to the eyebox (the center of the eyebox) via the relay optical system 13 described later and the projected unit. With this, the virtual image display region 9 can be positioned along a road surface 8. The display unit 12 may be attached with a first actuator 16C (FIG. 3) such as a motor controlled by a display control device 14, and may be movable and/or rotatable on the display surface 16.

The relay optical system 13 is positioned on the optical path of the image light from the display unit 12 (light from the display unit 12 toward the eyebox) between the display unit 12 and the front window shield 3 (an example of the projected unit), and includes one or more optical members that project the image light from the display unit 12 onto the front window shield 3 outside the HUD 1. The relay optical system 13 in FIG. 2 includes one concave-shaped first mirror 13a and one plane second mirror 13b.

The first mirror 13a has a free curved surface shape having a positive optical power. The second mirror 13b may be a curved surface having an optical power, instead of a plane surface. The relay optical system 13 of the present embodiment has a function to set the distance to the position where a virtual image is formed (virtual image display region 9) by this curved surface shape (an example of an optical power), and a function to generate a virtual image obtained by enlarging the image displayed on the screen 16 (display surface). In addition to this, the relay optical system 13 may also have a function to suppress (correct) the distortion of the virtual image that may occur due to the curved shape of the front window shield 3. The relay optical system 13 may fulfill the above optical functions by combining a plurality of mirrors (for example, the first mirror 13a and the second mirror 13b of the present embodiment).

In the present embodiment, the relay optical system 13 includes two mirrors, but is not limited to this. In addition to or as an alternative to these, one or more refractive optical member such as a lens, diffractive optical member such as a hologram, a reflective optical member, or a combination thereof may be included.

In addition, the relay optical system 13 may be movable and/or rotatable by attaching a second actuator 13C (FIG. 3) such as a motor controlled by the display control device 14.

The display control device 14 includes one or more I/O interfaces 141, one or more processors 142, and one or more memories 143. The various functional blocks illustrated in FIG. 3 may include hardware, software, or a combination of both.

The processor 142 is operably connected to the memory 143. More specifically, the processor 142 executes a program stored in the memory 143 and thus can control the display unit 12, the first actuator 16C, and the second actuator 13C to generate and/or transmit image data, for example. The processor 142 may include at least one general-purpose microprocessor (for example, a central processing unit (CPU)), and at least one application specific integrated circuit (ASIC), at least one field programmable gate array (FPGA), or any combination thereof. The memory 143 includes a magnetic medium of any type, such as a hard disk, an optical medium of any type, such as a CD and a DVD, a semiconductor memory of any type, such as a volatile memory, and a non-volatile memory. The volatile memory may include a DRAM and an SRAM, and the non-volatile memory may include a ROM and an NVROM.

As illustrated in the figure, the processor 142 is operably connected to the I/O interface 141. The I/O interface 141 may perform, via a bus 27, communication (also referred to as CAN communication) with an object detection unit 101 that detects the road surface 8 on which the vehicle 2 travels and other objects around the vehicle by a camera, a LiDAR, a V2X, or the like, and a vehicle information detection unit 102 that detects a vehicle speed, an acceleration and other vehicle information by a CAN transistor IC, a GNSS, an acceleration sensor, a motion sensor, a gyro sensor, or the like, in accordance with, for example, the CAN (Controller Area Network) standard. The communication standard employed by the I/O interface 141 is not limited to CAN, and includes in-vehicle communication (internal communication) interface which is a wired communication interface such as CANFD (CAN with Flexible Data Rate), LIN (Local Interconnect Network), Ethernet (registered trademark), MOST (Media Oriented Systems Transport: MOST is a registered trademark), UART, or USB, or is a short-range wireless communication interface within several tens of meters, such as a personal area network (PAN) such as Bluetooth (registered trademark) network, a local area network (LAN) such as 802.11x Wi-Fi (registered trademark). In addition, the I/O interface 141 may include an external communication (external communication) interface such as a wide-area communication network (for example, Internet communication network), according to a cellar communication standard such as Wireless WiMAX Network (WWAN0, IEEE802.16-2004 (WiMAX: Worldwide Interoperability for Microwave Access)), IEEE802.16e Base (Mobile WiMAX), 4G, 4G-LTE, LTE Advanced, and 5G.

As illustrated in the figure, the processor 142 is interoperably connected to the I/O interface 141 and thus can exchange information with various other electronic devices connected to the HUD 1. For example, an external sensor (an example of the object detection unit 101), an external camera (an example of the object detection unit 101), a speed sensor (an example of the vehicle information detection unit 102), and a vehicle ECU (an example of the vehicle information detection unit 102), an external communication device (not illustrated), an eye position sensor (not illustrated), and a height sensor (an example of the vehicle information detection unit 102), which are provided on the vehicle 2, are operably connected to the I/O interface 141.

The display unit 12 is operably connected to the processor 142. Therefore, the image displayed by the display unit 12 may be based on the image data received from the processor 142. The processor 142 controls the image displayed by the display unit 12 on the basis of the information acquired from the I/O interface 141. The I/O interface 141 may include a function to process (convert, calculate, analyze) information received from other electronic devices connected to the HUD 1.

Figure 4A:
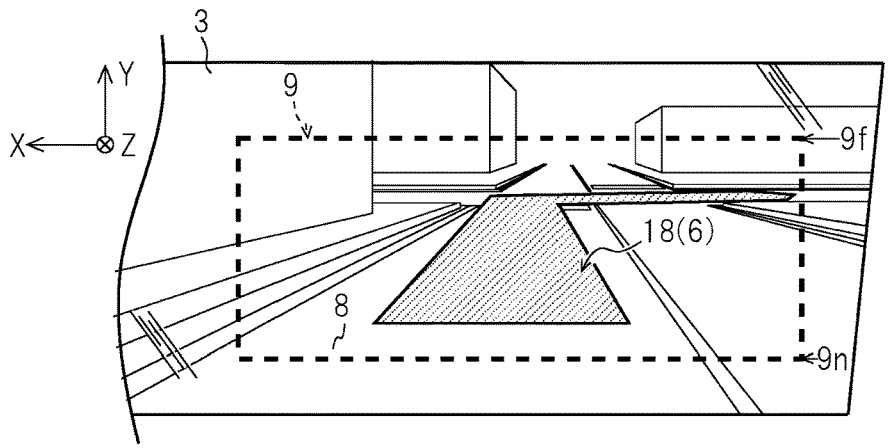
FIG. 4A is an explanatory diagram illustrating an example in which a navigation arrow is displayed on a front window shield by the head-up display device of FIG. 1.
Figure 4B:
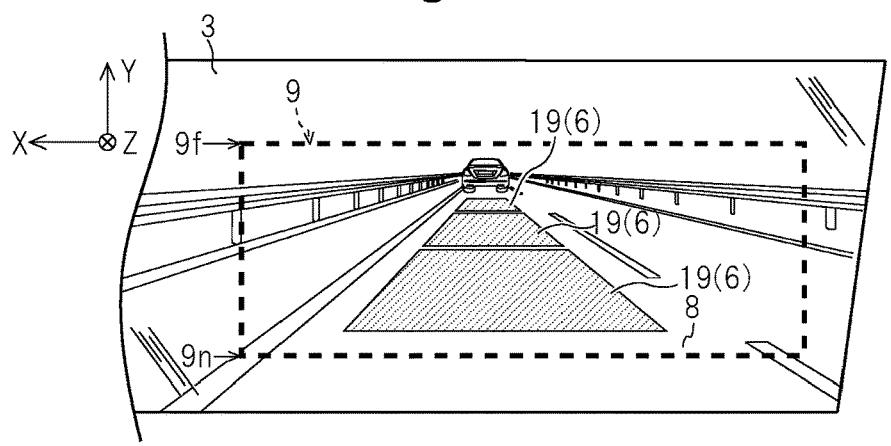
FIG. 4B is an explanatory diagram illustrating an example in which a guide indicating an inter-vehicle distance to a preceding vehicle is displayed by the head-up display device of FIG. 1.

The virtual image 6 generated by the display light 5 is visually recognized along the road surface 8 on which the vehicle 2 travels, and may include a navigation arrow 18 displayed in the virtual image display region 9 of the front window shield 3 illustrated in FIG. 4A, a guide 19 indicating the inter-vehicle distance from the preceding vehicle illustrated in FIG. 4B (the preceding vehicle is visually recognized by the viewer 7 as a real scene), and the like. The HUD 1 of this embodiment forms the virtual image display region 9 along the road surface 8. In FIG. 1, the HUD 1 projects the display light 5 in such a manner that the virtual image display region 9 is substantially parallel to the road surface 8 and is located below the road surface 8 (see FIG. 1), and the virtual image display region 9 is located at a predetermined depth (30 to 300 cm below the road surface 8) on the road surface 8 far (to the front) by a predetermined distance (8 to 50 m, sometimes 8 to 180 m) from the vehicle 2. Specifically, the virtual image display region 9 is configured in such a manner that a far end 9f is positioned at a position that is 50 [meter] from the vehicle 2, and a near end 9n is positioned at a position that is 8 [meter] from the vehicle 2. The virtual image display region 9 is a curved surface or a partially curved surface area where the image generated inside the HUD 1 is imaged as a virtual image, or a partially curved area, and is also called an imaging surface. The virtual image display region 9 is a position where a virtual image of the display surface (screen 16) described later of the HUD 1 is formed. That is, it can be said that the virtual image display region 9 corresponds to the display surface described later of the HUD 1, and the virtual image 6 visually recognized in the virtual image display region 9 corresponds to the image (not illustrated) displayed on the display surface of the HUD 1 described later. It is preferable that the virtual image display region 9 per se has low visibility to the extent that it is not actually visually recognized by the viewer 7 or is difficult to be visually recognized by the viewer 7.

In addition, as illustrated in FIG. 5, the display control device 14 may adjust the position of the virtual image display region 9 with respect to the vehicle 2 to be constant (in such a manner that the predetermined distance and/or the predetermined depth is maintained). That is, the display control device 14 acquires the pitching angle of the vehicle from the detection result of the vehicle information detection unit 102 (an acceleration sensor, a motion sensor, a gyro sensor, etc.) (step S1), and calculates the amount of deviation between the desired display position of the virtual image display region 9 (FIG. 6(a)) and the display position deviated by the acquired pitching angle (FIG. 6(b)) on the basis of the pitching angle and the predetermined distance and/or the predetermined depth (step S2). Then, so as to cancel the amount of deviation, the display surface 16 or/and the relay optical system 13 may be rotated or/and moved by the first actuator 16C or/and the second actuator 13C, thereby adjusting the position of the virtual image display region 9 with respect to vehicle 2 (step S3), and the display unit 12 may be controlled so as to project the display light 5 corresponding to the adjusted virtual image display region 9 (step S4).

In FIG. 5, the display control device 14 adjusts the position of the virtual image display region 9 in accordance with an actual change in the pitching angle. However, the object detection unit 101 (a camera, a LiDAR, etc.) may detect the shape and unevenness of the road surface 8 and takes the detection results into consideration, in improving the real time property by estimating the pitching angle at the next moment and adjusting the position of the virtual image display region 9.

Moreover, in order to position the virtual image display region 9 below the road surface 8, the display control device 14 may detect the road surface 8 by the object detection unit 101, or may consider the height of the road surface 8 to be the same as the height of the road surface on which the vehicle 2 touches the ground to thereby grasp the height of the road surface 8.

In the HUD 1 according to the present embodiment, the virtual image display region 9 is located below the road surface 8 on which the vehicle 2 travels, and the virtual image 6 is also displayed below the road surface 8. However, the virtual image 6 is visually recognized by the viewer 7 as if it were stuck to the road surface 8 due to the prejudice that the road surface 8 has no further back side, and this tendency becomes more remarkable as the virtual image display region 9 and the virtual image 6 are located farther from the vehicle 2 because the depth perception of the viewer 7 becomes insensitive. That is, in reality, when viewed from the viewer 7, the virtual image 6 is imaged on the back side (lower side) of the road surface 8, but the viewer 7 perceives the virtual image 6 as if it were displayed sticking on the surface of the road surface 8.

Figure 6A:
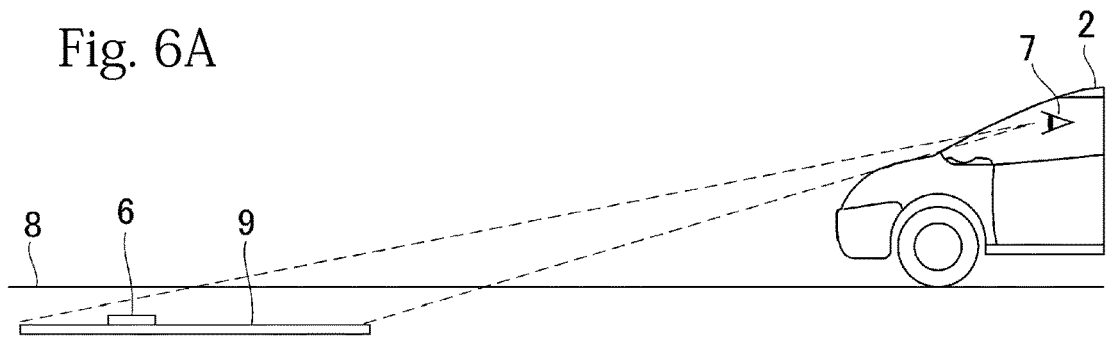
FIG. 6A is an explanatory diagram illustrating the virtual image display region generated by the head-up display device of FIG. 1.
Figure 6B:
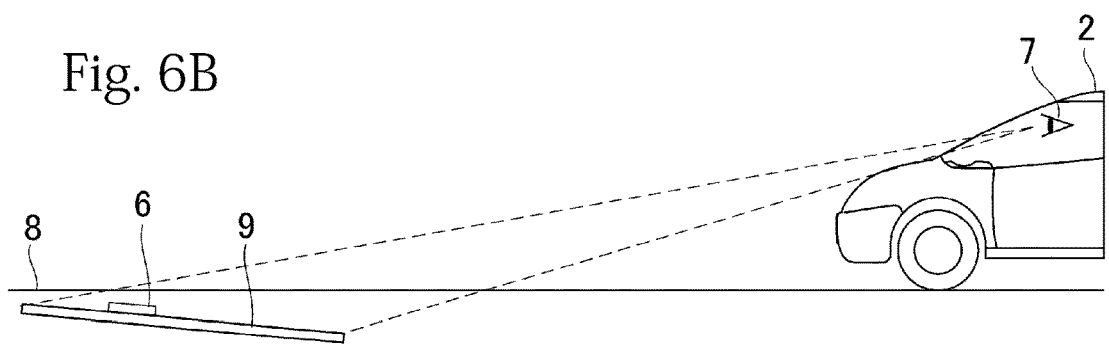
FIG. 6B is an explanatory diagram illustrating the virtual image display region when the front part of the vehicle of FIG. 6A is lifted and the rear part is sunk.

In addition, when the pitching angle of the vehicle 2 changes in a case where the position adjustment function of the virtual image display region 9 generated by the display control device 14 is not provided, or when the pitching angle of the vehicle 2 changes more than assumed based on the position adjustment function, even if the virtual image display region 9 floats up as illustrated in FIGS. 6(a) and 6(b), the virtual image display region 9 located below the road surface 8 is likely to be located below the road surface 8 even when floating up. Or even if the virtual image display region 9 is positioned above the road surface 8, the distance in the height direction (Y axis direction) between the road surface 8 and the virtual image display region 9 positioned above the road surface 8 can be kept small. For the viewer 7, the virtual image 6 appears to be stuck to the road surface 8, and the feeling of superimposition with the road surface 8 is not lost.

Therefore, according to the HUD 1, the virtual image 6 that is visually recognized to stick to the road surface 8 can be stably displayed even if the pitching angle of the vehicle 2 or the shape or unevenness of the road surface 8 changes while the vehicle 2 is traveling. Here, the display control device 14 adjusts the position of the virtual image display region 9 with respect to the vehicle 2 to be constant, and the virtual image display region 9 per se is suppressed from floating up from the road surface 8, and the virtual image 6 is displayed in a certain place when viewed from the viewer 7. Therefore, the virtual image 6 is displayed as if it were stuck to the road surface 8 more stably when the vehicle 2 is traveling, and its visibility is also improved.

Figure 7:
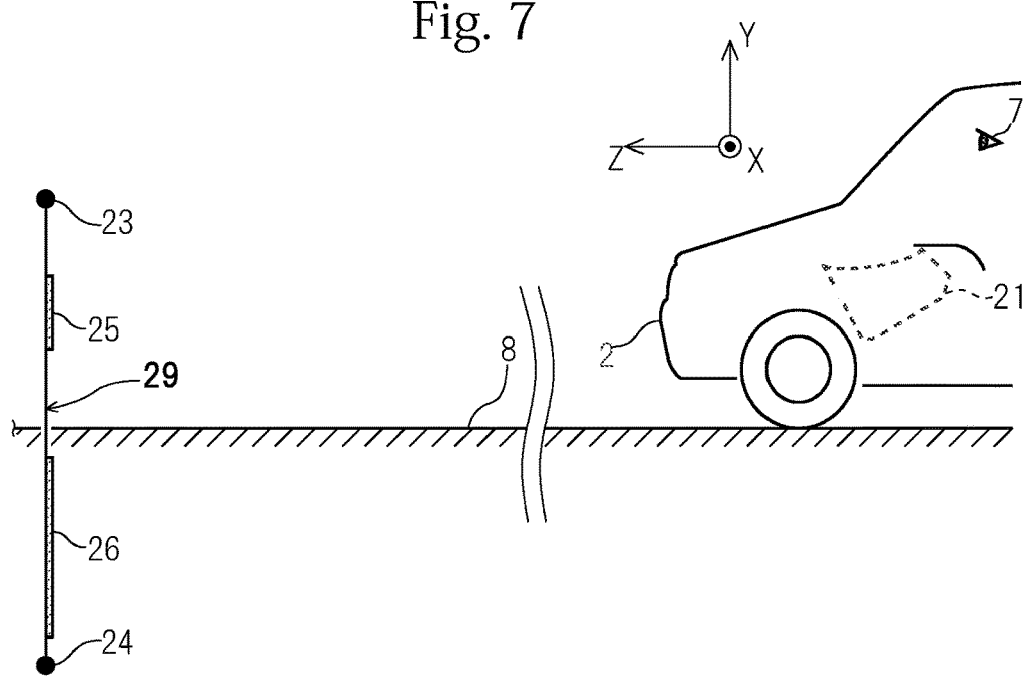
FIG. 7 is an explanatory diagram illustrating a vehicle provided with an other head-up display device according to a mode for carrying out the invention.

FIG. 7 illustrates a vehicle 2 provided with an other HUD 21 according to the present embodiment. The HUD 21 has the same configuration as that of the HUD 1 except that the positioning of the virtual image display region is different, and thus detailed description of each component is omitted.

In a virtual image display region 29 generated by the HUD 21, a far end 23 that is visually recognized overlapping with the road surface 8 on the farthest side when viewed from the viewer 7 is located above (in the Y axis positive direction) a near end 24 that is visually recognized overlapping the road surface 8 on the nearest side when viewed from the viewer 7, and is also located above the road surface 8. In addition, the near end 24 with respect to the vehicle 2 is located below the road surface 8 (in the Y axis negative direction).

Figure 8A:
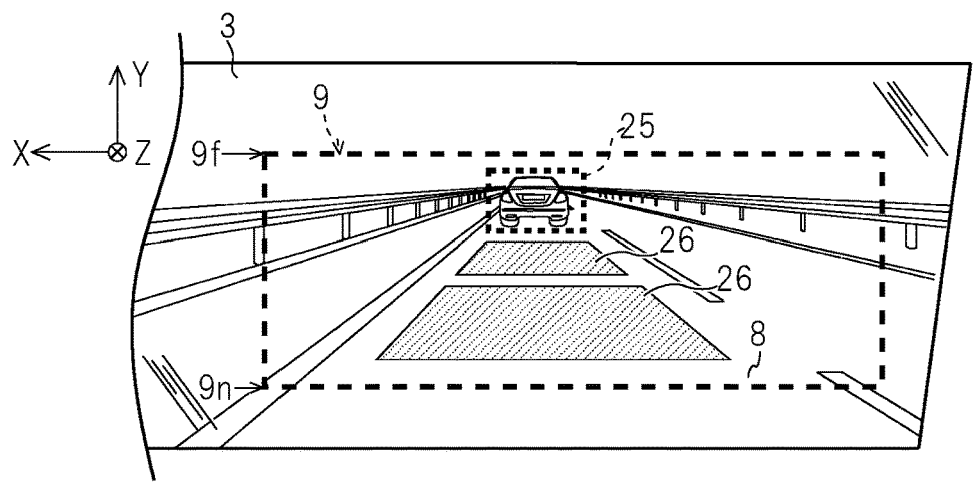
FIG. 8A is a diagram illustrating an example of a virtual image displayed by a head-up display device, according to some embodiments.

For example, as illustrated in FIG. 8A, in the portion of the virtual image display region 29 above the road surface 8, an upper virtual image (may be an image of a vehicle speed, a remaining distance to a next guide point by navigation, etc.) 25 superimposed on the background of the road surface 8 to indicate a FCW (forward collision warning) is displayed. In the portion below the road surface 8, a perspective lower virtual image (an image indicating a guide route, etc.) 26 that is visually recognized as being along the road surface 8 is displayed.

Figure 8B:
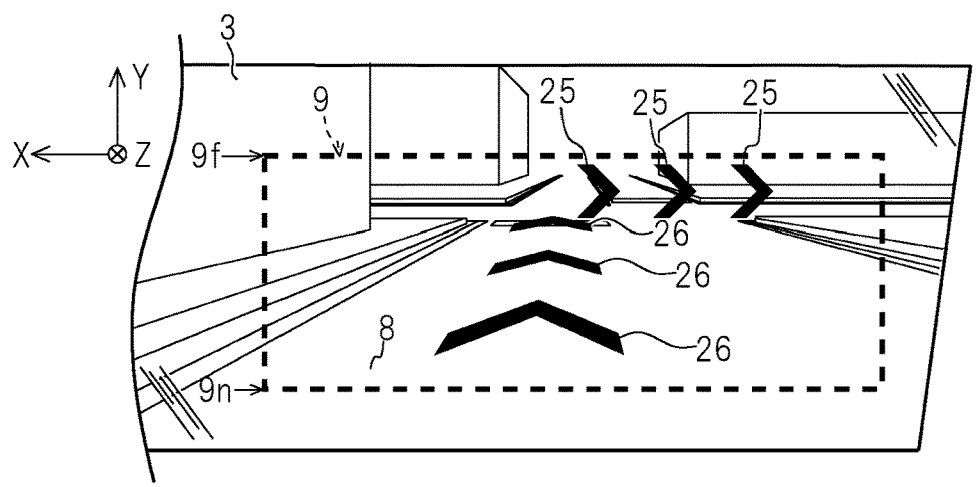
FIG. 8B is a diagram illustrating an example of a virtual image displayed by a head-up display device, according to some embodiments.

In addition, in some embodiments, as illustrated in FIG. 8B, also in the portion of the virtual image display region 29 above the road surface 8, a non-perspective (or less perceptive) upper virtual image 25 that appears to be raised toward the viewer 7 from an angle along the road surface 8 may be displayed as an image indicating a guide route or the like.

The perspective image referred to here is an arrow shape indicating the guide route of the vehicle 2, and is visually recognized as a virtual object along the road surface 8 in the foreground of the vehicle 2 when viewed from the viewer 7 (driver) seated in the driver's seat of the vehicle 2. In the perspective image, the size of the portion that is visually recognized overlapping the road surface 8 in the vicinity of the vehicle 2 is visually recognized to be larger than the size of the portion that overlaps the road surface 8 far away from the vehicle 2. Specifically, the width in the right-left direction (X axis direction) of the portion that is visually recognized overlapping the road surface 8 in the vicinity of the vehicle 2 is visually recognized to be larger than the width in the right-left direction of the portion that overlaps the road surface 8 far away from the vehicle 2. In such a case, the viewer 7 (driver) can perceive the perspective image as if he/she were overlooking (looking down from diagonally above) at a virtual object along the road surface 8.

On the other hand, in the non-perspective image, the size of the portion that is visually recognized overlapping the road surface 8 in the vicinity of the vehicle 2 is visually recognized to be the same as the size of the portion that overlaps the road surface 8 far away from the vehicle 2. Specifically, the width in the right-left direction (X axis direction) of the portion that is visually recognized overlapping the road surface 8 in the vicinity of the vehicle 2 is visually recognized to be the same as the width in the right-left direction of the portion that overlaps the road surface 8 far away from the vehicle 2. In such a case, the viewer 7 (driver) can perceive the non-perspective image as a virtual object along a plane (XY plane) consisting of up-down and right-left directions. That is, if a non-perspective image is defined as an image in which image parts such as characters, symbols, figures, illustrations, still images (photographs), and moving images are viewed from the front (or an angle close to the front), a perspective image can also be defined as an image in which the image parts are viewed from an angle rather than the front.

In the HUD 21, the far end 23 that is visually recognized overlapping the far side foreground of the virtual image display region 29 is located above the road surface 8, and the near end 24 that is visually recognized overlapping the near side foreground is located below the road surface 8. Therefore, while displaying the perspective lower virtual image 26 that is visually recognized along the road surface 8 similarly with the virtual image 6 on the near end 24 side, the non-perspective (or less perceptive) upper virtual image 25 that is difficult to see along the road surface 8 can be displayed on the far end 23 side.

Figure 9:
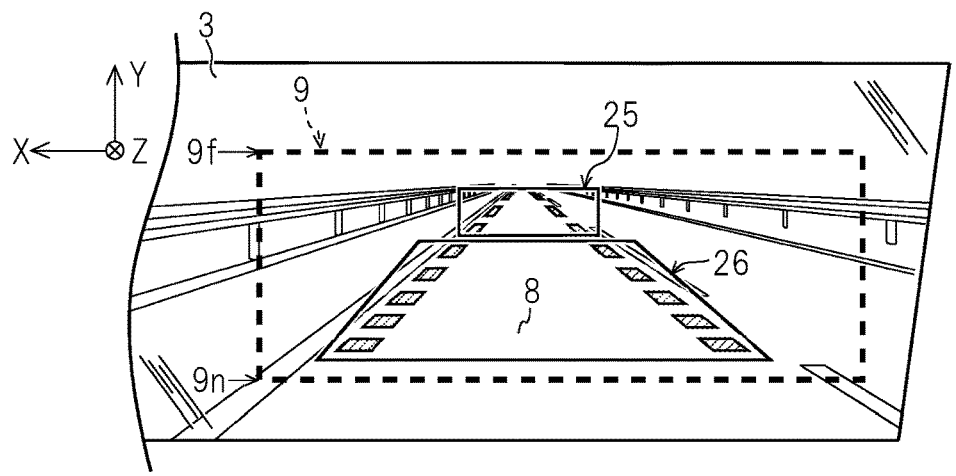
FIG. 9 is a diagram illustrating an example of a virtual image displayed by a head-up display device, according to some embodiments.

In addition, in some embodiments, as illustrated in FIG. 9, also in the portion of the virtual image display region 29 above the road surface 8, a perspective upper virtual image (an image indicating a guide route, etc.) 25 that is visually recognized as being along the road surface 8 may be displayed as an image indicating a guide route or the like.

The display position of the virtual image display region and the display content of the virtual image are arbitrary. The angle formed by the virtual image display region with the road surface may also be substantially parallel to the road surface 8 as in the virtual image display region 9, may also be substantially perpendicular to the road surface 8 as in the virtual image display region 29, or may also be any other angle. FIG. 10 to FIG. 14 are used to illustrate an example of the angle between the virtual image display region and the road surface.

Figure 10:
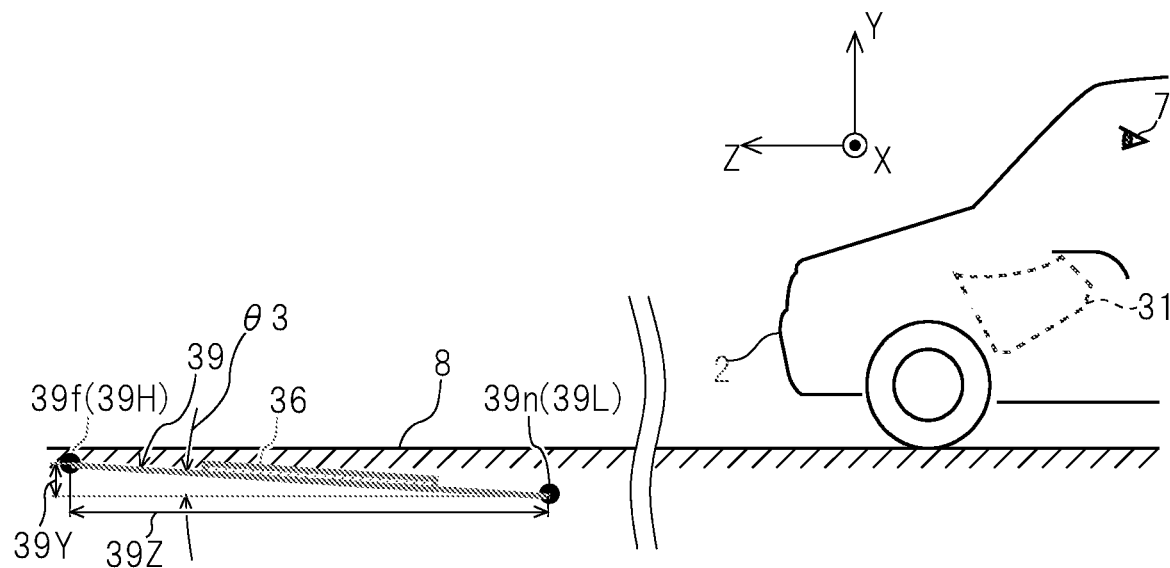
FIG. 10 is an explanatory diagram illustrating an example of a virtual image display region displayed by a head-up display device, according to some embodiments.

FIG. 10 illustrates a vehicle 2 provided with an other HUD 31 according to the present embodiment. The HUD 31 has the same configuration as that of the HUD 1 except that the positioning of the virtual image display region is different, and thus detailed description of each component is omitted.

A virtual image display region 39 generated by the HUD 31 is not parallel to the road surface 8, that is, has a predetermined positive third tilt angle θ3 with the road surface 8. A far end 39f that is visually recognized overlapping the road surface 8 on the farthest side when viewed from the viewer 7 is at a highest position 39H in the height direction (Y axis), and a near end 39n that is visually recognized overlapping the road surface 8 on the nearest side when viewed from the viewer 7 is at a lowest position 39L in the height direction (Y axis). Furthermore, in the virtual image display region 39 in FIG. 10, the entire virtual image display region 39 is located below the road surface 8 (in the Y axis negative direction). The rotation angle in the Y axis positive direction with the X direction as the axis with respect to the Z axis positive direction in FIG. 10 (the same applies to the following description of FIGS. 11 to 14) is defined as a "positive direction", and the rotation angle in the opposite direction is defined as a "negative direction". In addition, the virtual image display region 39 generated by the HUD 31 has a substantially constant angle (tilt angle) with respect to the road surface 8 from the vicinity of the vehicle 2 toward the far side. Apart of the virtual image display region 39 generated by the HUD 31, that is, a part of the virtual image display region 39 including the highest position 39H may be positioned above the road surface 8, and the other part including the lowest position 39L may be positioned below the road surface 8. The discomfort felt when the virtual image is displayed deviated to the front side of the road surface when viewed from the viewer is greater than the discomfort felt when the image is displayed deviated to the back side of the road surface. Therefore, even if the posture (pitching angle) of the vehicle 2 changes, it is possible to prevent the virtual image display region 39 from being positioned above the road surface 8. Even when the virtual image display region on the near side is positioned above the road surface 8 due to the change in the posture of the vehicle 2, the distance between the virtual image 36 on the near side and the road surface 8 in the height direction can be kept small.

Figure 11:
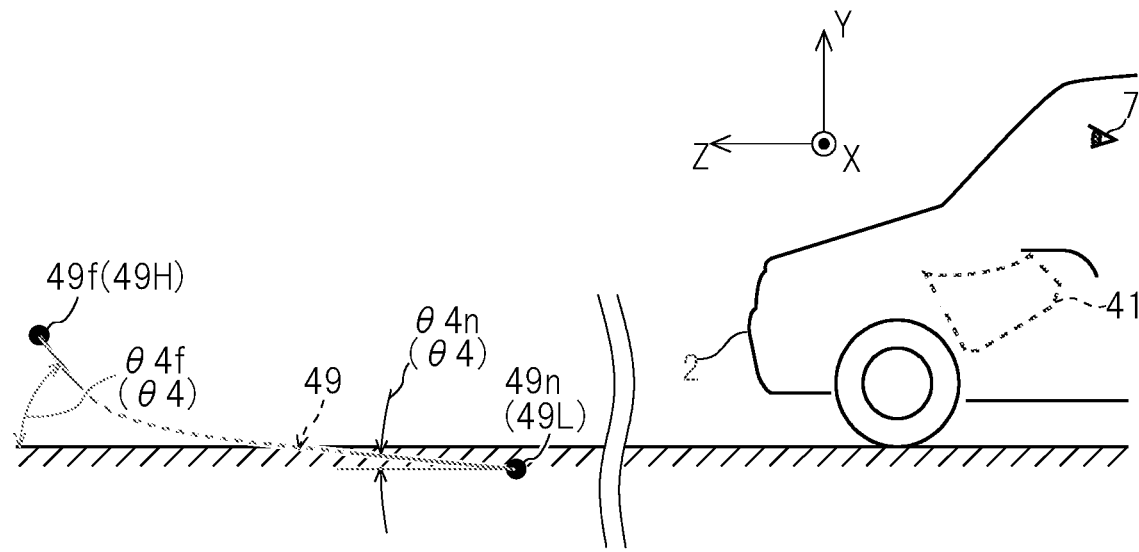
FIG. 11 is an explanatory diagram illustrating an example of a virtual image display region displayed by a head-up display device, according to some embodiments.

FIG. 11 illustrates a vehicle 2 provided with an other HUD 41 according to the present embodiment. The HUD 41 has the same configuration as that of the HUD 1 except that the positioning and shape of the virtual image display region is different, and thus detailed description of each component is omitted.

A virtual image display region 49 generated by the HUD 41 is different from the virtual image display region 39 illustrated in FIG. 10 in that it is curved when viewed from the right-left direction of the vehicle 2. The virtual image display region 49 generated by the HUD 41 is not parallel to the road surface 8, that is, has a predetermined positive fourth tilt angle θ4 with the road surface 8, which is not constant. A far end 49f that is visually recognized overlapping the road surface 8 on the farthest side when viewed from the viewer 7 is at a highest position 49H in the height direction (Y axis), and a near end 49n that is visually recognized overlapping the road surface 8 on the nearest side when viewed from the viewer 7 is at a lowest position 49L in the height direction (Y axis). Furthermore, in the virtual image display region 49 in FIG. 11, a part of the virtual image display region 49 including the highest position 49H is positioned above the road surface 8, and the other part including the lowest position 49L is positioned below the road surface 8. In addition, in the virtual image display region 49 generated by the HUD 41, the angle (fourth tilt angle θ4) with respect to the road surface 8 broadly monotonously increases (non-monotonously decreases) from the vicinity of the vehicle 2 toward the far side. The entire virtual image display region 49 may be positioned below the road surface 8 (Y axis negative direction). As a result, it is possible to prevent the image on the near side, with which the perspective difference (distance difference) is easily felt, from being positioned above the road surface 8 even when the posture (pitching angle) of the vehicle 2 changes. Even when the image on the near side is positioned above the road surface 8 due to the change in the pitching of the vehicle 2, the distance between the image on the near side and the road surface 8 in the height direction can be kept small. In addition, by curving the virtual image display region on the far side so as to rise from an angle along the road surface to the viewer side, the virtual image display region on the far side seen from the viewer can be overlapped with a wide foreground region (for example, the road surface). In other words, the area of the overlapping foreground (for example, the road surface) per unit area of the virtual image display region can be expanded, and images can be efficiently displayed superimposed on a wide foreground.

Figure 12:
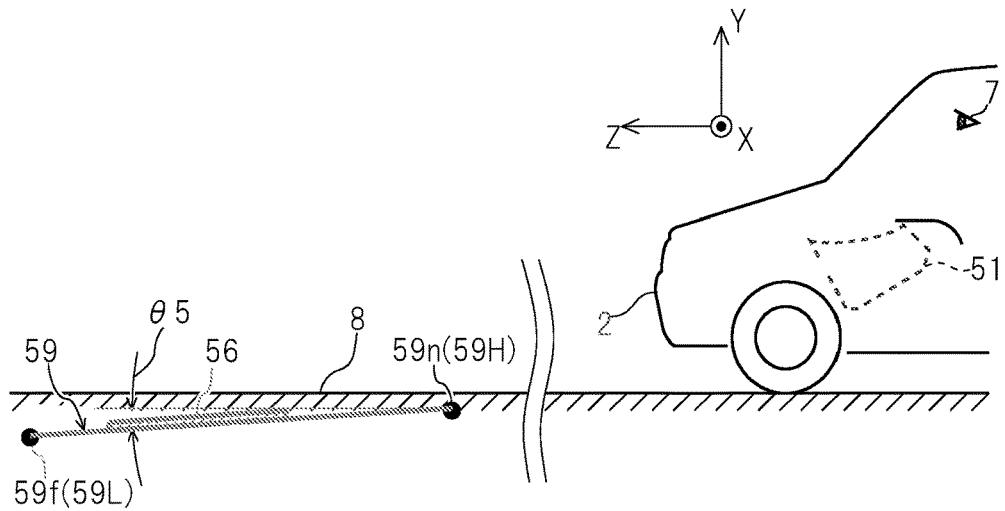
FIG. 12 is an explanatory diagram illustrating an example of a virtual image display region displayed by a head-up display device, according to some embodiments.

FIG. 12 illustrates a vehicle 2 provided with an other HUD 51 according to the present embodiment. The HUD 51 has the same configuration as that of the HUD 1 except that the positioning of the virtual image display region is different, and thus detailed explanation of each component is omitted.

The virtual image display region 59 generated by the HUD 51 is not parallel to the road surface 8, that is, has a predetermined negative fifth tilt angle θ5 with the road surface 8 in such a manner that the far side is positioned low and the near side is positioned high. A far end 59f that is visually recognized overlapping the road surface 8 on the farthest side when viewed from the viewer 7 is at a lowest position 59L in the height direction (Y axis), and a near end 59n that is visually recognized overlapping the road surface 8 on the nearest side when viewed from the viewer 7 is at a highest position 59H in the height direction (Y axis). Furthermore, in the virtual image display region 59 in FIG. 12, a part of the virtual image display region 59 including the highest position 59H is positioned above the road surface 8, and the other part including the lowest position 59L is positioned below the road surface 8. In addition, the virtual image display region 59 generated by the HUD 51 has a substantially constant angle (fifth tilt angle θ5) with respect to the road surface 8 from the vicinity of the vehicle 2 toward the far side. The entire virtual image display region 59 may be positioned below the road surface 8 (Y axis negative direction). When the pitching angle of the vehicle 2 changes, according to the pitching angle of the vehicle 2, the farther the position of the virtual image display region 59 is, the larger the movement of the position is. Therefore, the far side is more likely to be positioned above the road surface 8 due to the change in the pitching angle of the vehicle 2. However, by setting a part of the virtual image display region 59 positioned below the road surface 8 to the far side, even if the pitching angle of the vehicle 2 changes, it is possible to prevent an image on the far side, whose position is likely to change due to the change in the pitching angle of the vehicle 2, from being positioned above the road surface 8. Even when an image on the far side is positioned above the road surface 8 due to the change in the pitching of the vehicle 2, the distance between the image on the far side and the road surface 8 in the height direction can be kept small.

Figure 13:
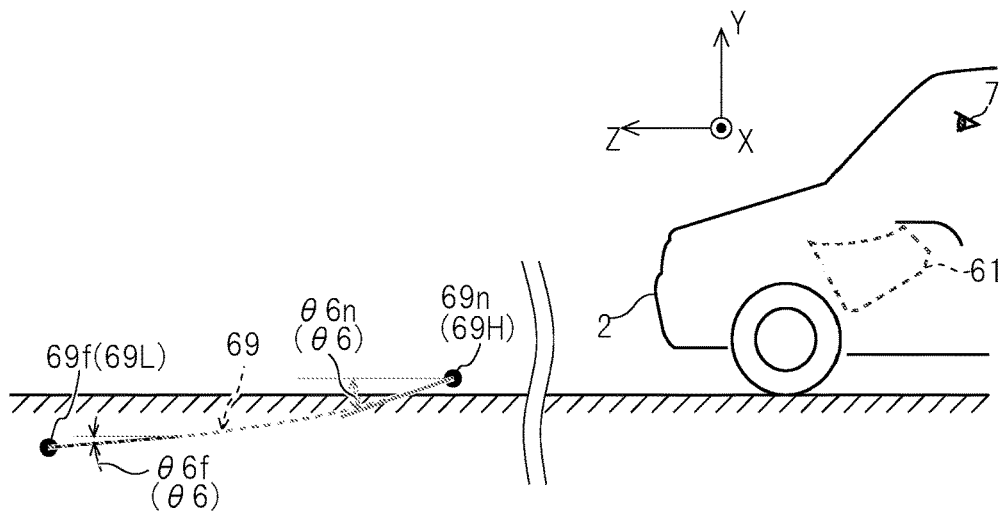
FIG. 13 is an explanatory diagram illustrating an example of a virtual image display region displayed by a head-up display device, according to some embodiments.

FIG. 13 illustrates a vehicle 2 provided with an other HUD 61 according to the present embodiment. The HUD 61 has the same configuration as that of the HUD 1 except that the positioning and shape of the virtual image display region is different, and thus detailed description of each component is omitted.

A virtual image display region 69 generated by the HUD 61 is different from the virtual image display region 69 illustrated in FIG. 12 in that it is curved when viewed from the right-left direction (X axis direction) of the vehicle 2. The virtual image generated by the HUD 61 is not parallel to the road surface 8, that is, has a predetermined negative sixth tilt angle θ6 that is not constant with the road surface 8. A far end 69f that is visually recognized overlapping the road surface 8 on the farthest side when viewed from the viewer 7 is at a lowest position 69L in the height direction (Y axis), and a near end 69n that is visually recognized overlapping the road surface 8 on the nearest side when viewed from the viewer 7 is at a highest position 69H in the height direction (Y axis). Furthermore, in the virtual image display region 69 in FIG. 13, a part of the virtual image display region 69 including the highest position 69H is positioned above the road surface 8, and the other part including the lowest position 69L is positioned below the road surface 8. In addition, in the virtual image display region 69 generated by the HUD 61, the angle (sixth tilt angle θ6) with respect to the road surface 8 broadly monotonously increases (non-monotonously decreases) from the vicinity of the vehicle 2 toward the far side. Specifically, the sixth tilt angle θ6 may broadly monotonously increase (non-monotonously decrease) in such a manner that a sixth far tilt angle θ6f (may be 0 [degree]) between the tangent line of the virtual image display region 69 at the far end 69f and the road surface 8 is larger than a sixth near tilt angle θ6n (negative angle) between the tangent of the virtual image display region 69 at the near end 69n and the road surface 8, and that the sixth tilt angle θ6 approaches 0 [degree] from a negative angle as it goes from the near end 69n to the far end 69f. As a result, in addition to the effect of the HUD 51 illustrated in FIG. 10, by increasing the tilt angle of the virtual image display region on the far side, the virtual image display region on the far side seen by the viewer can be overlapped with the wide road surface region. In other words, the area of the overlapping road surface per unit area of the virtual image display region can be expanded, and images can be efficiently displayed superimposed on a wide road surface.

Figure 14:
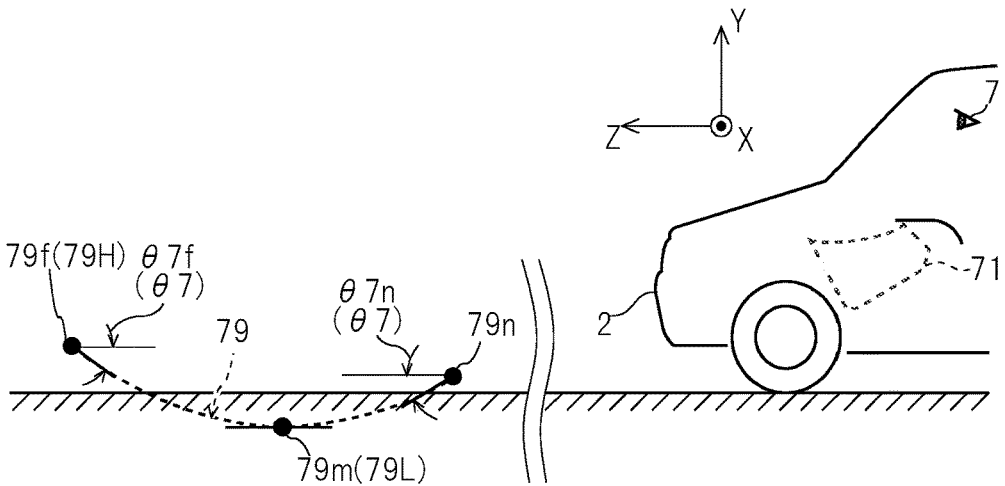
FIG. 14 is an explanatory diagram illustrating an example of a virtual image display region displayed by a head-up display device, according to some embodiments.
Figure 15A:
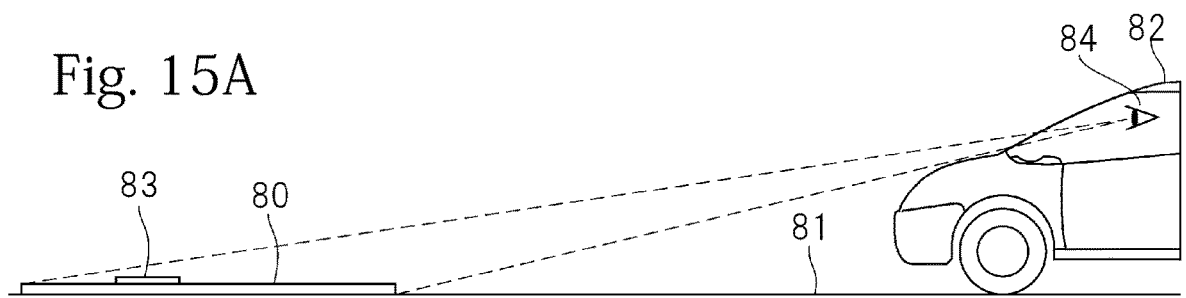
FIG. 15A is an explanatory diagram illustrating the virtual image display region generated by the head-up display device of FIG. 1.
Figure 15B:
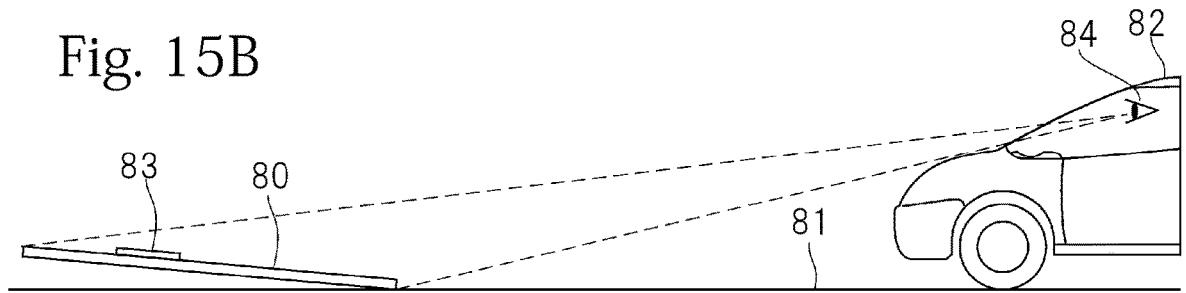
FIG. 15B is an explanatory diagram illustrating the virtual image display region when the front part of the vehicle of FIG. 15A is lifted and the rear part is sunk.

FIG. 14 illustrates a vehicle 2 provided with an other HUD 71 according to the present embodiment. The HUD 71 has the same configuration as that of the HUD 1 except that the positioning and shape of the virtual image display region is different, and thus detailed description of each component is omitted.

A virtual image display region 79 generated by the HUD 71 is not parallel to the road surface 8, that is, has a predetermined seventh tilt angle θ7 that is not constant with the road surface 8. A middle region 79m between a far end 79f that is visually recognized overlapping the road surface 8 on the farthest side when viewed from the viewer 7 and a near end 79n that is visually recognized overlapping the road surface 8 on the nearest side when viewed from the viewer 7 is at a lowest position 79L in the height direction (Y axis). Furthermore, in the virtual image display region 79 in FIG. 14, a part of the virtual image display region 79 including a highest position 79H is positioned above the road surface 8, and the other part including the lowest position 79L is positioned below the road surface 8. In addition, in the virtual image display region 79 generated by the HUD 71, the angle (seventh tilt angle θ7) with respect to the road surface 8 broadly monotonously increases (non-monotonously decreases) from the vicinity of the vehicle 2 toward the far side. Specifically, the seventh tilt angle θ7 may broadly monotonously increase (non-monotonously decrease) in such a manner that a seventh near tilt angle θ7n between the tangent line of the virtual image display region 79 at the near end 79n and the road surface 8 is a negative angle, a seventh tilt angle θ7 between the tangent line of the virtual image display region 79 at the middle region 79m and the road surface 8 is 0 [degree], a seventh far tilt angle θ7f between the tangent of the virtual image display region 79 at the far end 79f and the road surface 8 is a positive angle, and the seventh tilt angle θ7 changes from a negative angle to a positive angle as it goes from the near end 79n to the far end 79f. As a result, the distance from the road surface 8 in the height direction can be kept small in the near end 79n, the far end 79f, and the region between them.

In addition, in the virtual image display region 79 of FIG. 14, the far end 79f and the near end 79n are positioned above the road surface 8, and the other part including the lowest position 79L is positioned below the road surface 8. By positioning the far end 79f above the road surface 8, the virtual image display region on the far side seen from the viewer can be overlapped with a wide foreground region (for example, the road surface). In other words, the area of the overlapping foreground (for example, the road surface) per unit area of the virtual image display region can be expanded, and images can be efficiently displayed superimposed on a wide foreground. Moreover, by positioning, above the road surface, the virtual image display region on the near side, with which the perspective difference (distance difference) between the virtual image and the background (foreground, typically the road surface) that overlaps the virtual image in the front-rear direction is easily felt, it is possible to prevent the discomfort felt that the virtual image is displayed on the back side (lower side) of the road surface 8 when viewed from the viewer 7. In the virtual image display region 79 of FIG. 14, the far end 79f and the near end 79n are positioned above the road surface 8, but the positioning is not limited to this, and at least one of the far end 79f and the near end 79n may be positioned below the road surface 8.

While the mode for carrying out the present invention have been illustrated above, the embodiments of the present invention is not limited to those described above, and may be appropriately modified without departing from the spirit of the invention.

For example, if a HUD can position at least a part of a virtual image display region below a road surface on which a vehicle travels, the configuration of a display unit and other components is arbitrary.

In order to enhance the visual degree of the virtual image appearing to stick to the road surface (superimposition of the virtual image with the road surface, a sense of unity), it is desirable that the virtual image display region is near the road surface in a state of lying down as a whole (a state of being almost parallel to the road surface).

FIG. 11 is referred to again. Specifically, it is indicated that, in the virtual image display region almost parallel to the road surface, a distance 39Z in the depth direction (Z axis direction) between the far end 39*f* and the near end 39*n* of the virtual image display region 39 is 20 times as long as or longer than a distance 39Y in the height direction (Y axis direction) between the highest position 39H and the lowest position 39L of the virtual image display region 39, and that, more preferably, the distance 39Z in the depth direction (Z axis direction) is 40 times as long as or longer than the distance 39Y in the height direction (Y axis direction).

DESCRIPTION OF REFERENCE NUMERALS 1, 21, 31, 41, 51, 61, 71 head-up display device (HUD)
2 vehicle
3 front window shield (reflective transmissive member)
5 display light
5*p* optical axis
6, 25, 26, 36, 56 virtual image
7 viewer
8 road surface
9, 29, 39, 49, 59, 69, 79 virtual image display region
9*f*, 39*f*, 49*f*, 59*f*, 69*f*, 79*f* far end (of a virtual image display region with respect to a vehicle)
9*n*, 39*n*, 49*n*, 59*n*, 69*n*, 79*n* near end (of a virtual image display region with respect to a vehicle)
12 display unit
13 relay optical system
13*a* first mirror
13*b* second mirror
13C second actuator
14 display control device
15 projector
16 screen (display surface)
16C first actuator
101 object detection unit
102 vehicle information detection unit
141 I/O interface
142 processor
143 memory
θ tilt angle
θ4 fourth tilt angle
θ5 fifth tilt angle
θ6 sixth tilt angle
θ6*f* sixth far tilt angle
θ6*n* sixth near tilt angle
θ7 seventh tilt angle
θ7*f* seventh far tilt angle
θ7*n* seventh near tilt angle

The invention claimed is:

1. A head-up display device for allowing a viewer on a vehicle to visually recognize a virtual image in a virtual image display region, the head-up display device comprising:
   a display unit including a display surface emitting display light that is a source of the virtual image; and
   a relay optical system configured to relay the display light emitted by the display surface toward a projected unit to maintain at least a part of the virtual image display region to be below a road surface on which the vehicle travels.

2. The head-up display device according to claim 1, comprising the display unit configured in such a manner that the display surface is positioned to be tilted with respect to an optical axis of the display light directed toward the viewer in a direction in which the virtual image display region is along a front-rear direction of the vehicle.

3. The head-up display device according to claim 1, wherein a far end of the virtual image display region seen from the viewer in a front-rear direction of the vehicle is positioned at a highest position of the virtual image display region.

4. The head-up display device according to claim 1, comprising the virtual image display region configured in such a manner that a far end seen from the viewer in a front-rear direction of the vehicle is positioned above the road surface, and a near end seen from the viewer in the front-rear direction of the vehicle is positioned below the road surface.

5. The head-up display device according to claim 3, comprising the virtual image display region configured in such a manner that an angle of a tangent line with respect to the front-rear direction of the vehicle broadly monotonously increases from a vicinity of the viewer toward a far side.

6. The head-up display device according to claim 1, wherein a far end of the virtual image display region seen from the viewer in a front-rear direction of the vehicle is positioned at a lowest position of the virtual image display region.

7. The head-up display device according to claim 1, comprising the virtual image display region configured in such a manner that a far end seen from the viewer in a front-rear direction of the vehicle is positioned below the road surface, and a near end seen from the viewer in the front-rear direction of the vehicle is positioned above the road surface.

8. The head-up display device according to claim 6, comprising the virtual image display region configured in such a manner that an angle of a tangent line with respect to the front-rear direction of the vehicle broadly monotonously increases from a vicinity of the viewer toward a far side.

9. The head-up display device according to claim 1, wherein a middle region between a far end and a near end of the virtual image display region seen from the viewer in a front-rear direction of the vehicle is positioned at a lowest position of the virtual image display region.

10. The head-up display device according to claim 9, comprising the virtual image display region configured in such a manner that the far end or/and the near end are positioned above the road surface.

11. The head-up display device according to claim 1, further comprising:
   one or more actuators configured to move or/and rotate the display surface or/and the relay optical system;
   one or more I/O interfaces;
   one or more processors;

a memory; and one or more computer programs stored in the memory and configured to be executed by the one or more processors, wherein the one or more processors are configured to execute an instruction to acquire a position of the road surface and to drive the actuators in such a manner that at least a part of the virtual image display region is positioned below the road surface on a basis of the position of the road surface.

12. A head-up display device for allowing a viewer on a vehicle to visually recognize a virtual image in a virtual image display region, the head-up display device comprising:

a display unit including a display surface emitting display light that is a source of the virtual image; and a relay optical system configured in such a manner that the display light emitted by the display surface is relayed toward a projected unit, and that at least a part of the virtual image display region is positioned below a road surface on which the vehicle travels, wherein the virtual image display region is configured to be in a curved shape in such a manner that an angle of a tangent line with respect to a front-rear direction of the vehicle broadly monotonously increases from a vicinity of the viewer toward a far side of the viewer.

13. The head-up display device according to claim 12, wherein a far end of the virtual image display region seen from the viewer in the front-rear direction of the vehicle is positioned at a highest position of the virtual image display region.

14. A head-up display device for allowing a viewer on a vehicle to visually recognize a virtual image in a virtual image display region, the head-up display device comprising:

a display unit including a display surface emitting display light that is a source of the virtual image; and a relay optical system configured in such a manner that the display light emitted by the display surface is relayed toward a projected unit, and that at least a part of the virtual image display region is positioned below a road surface on which the vehicle travels, wherein the virtual image display region comprises i) a far end and ii) a near end positioned closer to the vehicle than the far end, and wherein the near end of the virtual image display region is positioned at eight meters in front of the vehicle.

* * * * *